T. OLINGER.
PULLEY CONSTRUCTION.
APPLICATION FILED JUNE 14, 1920.
1,372,900. Patented Mar. 29, 1921.
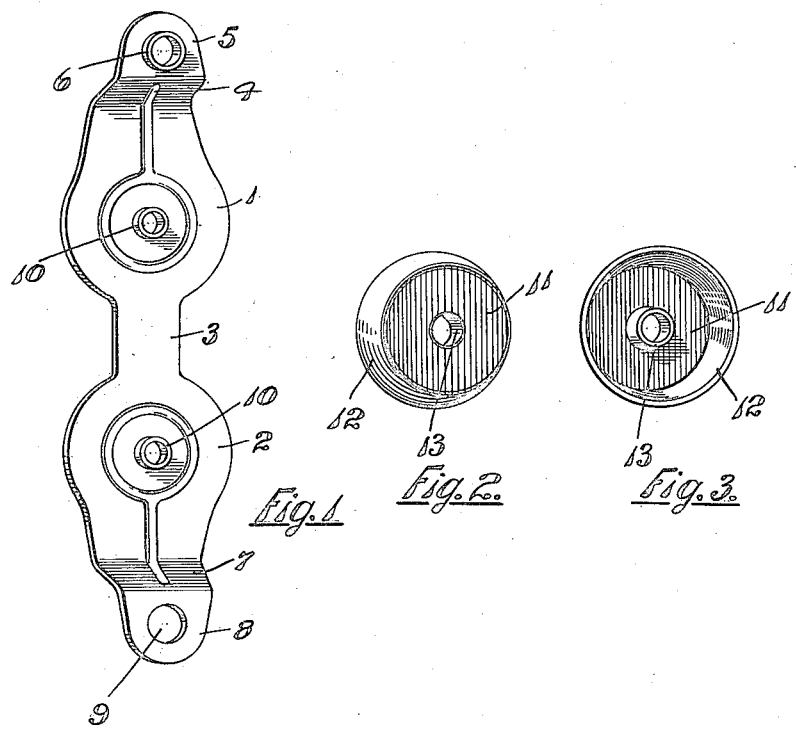
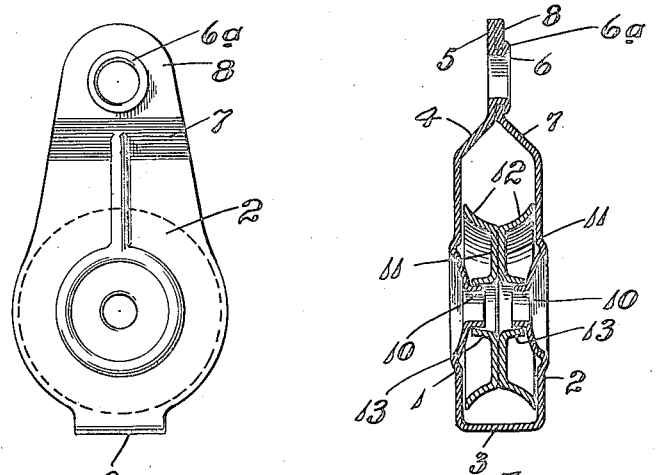
Inventor
Thomas Olinger
By Frank E. Linnane, Jr.
Attorney

UNITED STATES PATENT OFFICE.

THOMAS OLINGER, OF HOLLAND, MICHIGAN.

PULLEY CONSTRUCTION.

1,372,900.  Specification of Letters Patent. Patented Mar. 29, 1921.

Application filed June 14, 1920. Serial No. 388,727.

*To all whom it may concern:*

Be it known that I, THOMAS OLINGER, a citizen of the United States of America, residing at Holland, in the county of Ottawa and State of Michigan, have invented certain new and useful Improvements in Pulley Constructions; and I do hereby declare the following to be a full, clear, and exact description of the invention, such as will enable others skilled in the art to which it appertains to make and use the same.

This invention relates to a pulley construction, being particularly concerned with a pulley made solely from sheet metal of but three parts, each of which is very readily made with dies and in large quantities, whereby the cost of manufacture is reduced to a minimum. In addition the assembly is a very simple operation. It is a primary object and purpose of the invention to construct a pulley entirely of sheet metal, making one that is durable and efficient for the purposes for which it is designed, and containing novel constructions whereby the pulley is of the simplest possible construction, yet particularly efficient in use and operation.

For an understanding of the invention, reference may be had to the following description taken in connection with the accompanying drawing, in which, Figure 1 is a perspective view of the hanger portion of the pulley as it is blanked and formed previous to assembly.

Figs. 2 and 3 are perspective views looking at one of the halves of the rotatably mounted pulley, said views being of opposed sides thereof.

Fig. 4 is a side elevation of the assembled pulley construction, and

Fig. 5 is a vertical section taken transversely of the assembled construction.

Like reference characters refer to like parts in the different views of the drawing.

The pulley construction includes a hanger part shown in Fig. 1 stamped from sheet metal and including two sides 1 and 2 connected integrally by a narrower bottom portion 3. At the opposite end, side 1 is bent at an angle as indicated at 4 for a short distance and is then bent outwardly in a plane substantially parallel with the plane of the side 1 making an ear 5 from the central portion of which a ring 6 is pressed as shown. The side 2 is similarly formed at its outer end with an inturned part 7 corresponding to the part 4 and with an ear 8 corresponding to ear 5. Ear 8 has an opening 9 punched through it of a size to freely receive the ring 6. Centrally of each side 1 and 2, the metal is pressed inwardly to form bearing rings 10 as shown.

The pulley proper consists of two halves each pressed from sheet metal including each a web 11 and an annular flange 12 curved outwardly and away from the web, the two flanges when the two halves of the pulley are brought together with the webs 11 in contact making an annular concaved groove adapted to receive a cable, chain or like flexible member which is to run over the pulley. Each web at its center is formed with an integral outwardly pressed hub 13, the inner dimensions of which are slightly larger than the outer dimensions of the bearing rings 10 made on the sides 1 and 2.

In the assembled pulley construction, the two halves of the pulley are placed together with webs 11 in contact and with hubs 13 extending outwardly. The hanger member is bent to place the sides 1 and 2 in parallel relation, the bearing rings 10 entering the hubs 13. Ears 5 and 8 come together, the ring 6 passing through opening 9 after which it is spread and headed over as indicated at 6ª, making a secure connection as is obvious. It is not necessary to secure the two parts of the pulley together in any way.

This construction of pulley is very economically manufactured. It consists of the three parts only and there are no expensive manufacturing or assembling operations. The pulley is particularly adapted to be used to carry furnace chains such as lead to the drafts of the furnace and in every way it is fully capable of indefinitely sustaining the wear to which it is subjected in such use. In practice it has proven fully satisfactory, several hundred thousand having been manufactured for this purpose.

It is of course obvious that the construction of pulley disclosed is not limited to the one use named. I do not consider my invention as thus limited, nor is the invention limited to the exact construction shown and described. The appended claims define the invention and I consider myself entitled to all forms of structure falling within their scope.

I claim:

1. A pulley construction comprising a hanger having substantially parallel sides connected at their upper and lower ends, each of said sides being formed with an inwardly extending integral bearing portion, and a pulley located between the sides of the hanger having hub portions extending outwardly at each side and passing over said bearing portions on the sides.

2. A pulley construction comprising a hanger of sheet metal having substantially parallel sides connected integrally at their lower ends by an integral bottom, means connecting the sides together at their upper ends, each of said sides being formed with an inwardly extending integral bearing ring pressed from the said sides, and a pulley located between the sides of the hanger having hub portions extending outwardly at each side of the pulley and passing over said bearing rings.

3. A pulley construction comprising a hanger of sheet metal having substantially parallel sides connected integrally at their lower ends by a cross bottom portion, means connecting the sides together at their upper ends, each of said sides being formed with an inwardly extending integral bearing ring pressed therefrom, and a pulley located between the sides of the hanger, said pulley being formed of two sheet metal halves, each including a web having an annular outwardly curved flange and a central outwardly pressed hub, said hubs passing over and mounting on the bearing rings on said sides.

4. A pulley construction comprising a hanger of sheet metal having substantially parallel sides connected integrally at their lower ends by a cross bottom portion, means connecting the sides together at their upper ends comprising a ring pressed laterally from one of the sides, passing through an opening in the other side and riveted over after such passage, and a pulley located between the sides of the hanger and rotatably mounted on said sides, substantially as described.

5. In a pulley construction, a sheet metal hanger having substantially parallel spaced apart sides each formed with an inwardly pressed integral bearing ring, and a sheet metal pulley disposed between the said sides, said pulley comprising two halves positioned against each other, each half having an outwardly extending integral hub passing over a bearing ring on the adjacent side of the hanger.

6. In a pulley construction, an open hanger including substantially parallel sides each formed with an integral inwardly extending bearing part, and a pulley located between the sides of the hanger, said pulley being formed of two halves each comprising a web, an annular outwardly curved flange and an outwardly extending central hub, the webs of the halves being placed against each other and the hubs passing over said bearing parts on the sides of the hanger.

In testimony whereof I affix my signature.

THOMAS OLINGER.